United States Patent
Ng et al.

(10) Patent No.: US 8,358,263 B2
(45) Date of Patent: Jan. 22, 2013

(54) COLOR CONTROL OF A BACKLIGHTING SYSTEM

(75) Inventors: Joh Joh Ng, Penang (MY); Tak Meng Cheang, Penang (MY); Boon Keat Tan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 816 days.

(21) Appl. No.: 12/037,781

(22) Filed: Feb. 26, 2008

(65) Prior Publication Data

US 2009/0213062 A1 Aug. 27, 2009

(51) Int. Cl.
*G09G 3/36* (2006.01)

(52) U.S. Cl. .......... 345/102; 345/87; 345/204; 313/498; 315/169.2; 359/237

(58) Field of Classification Search .................. 345/204, 345/87, 102
See application file for complete search history.

(56) References Cited

U.S. PATENT DOCUMENTS

| | | | | |
|---|---|---|---|---|
| 6,127,783 A * | 10/2000 | Pashley et al. | ................ | 315/149 |
| 6,498,440 B2 * | 12/2002 | Stam et al. | .................... | 315/291 |
| 6,507,159 B2 * | 1/2003 | Muthu | .......................... | 315/307 |
| 6,611,000 B2 * | 8/2003 | Tamura et al. | .................. | 257/80 |
| 6,888,529 B2 * | 5/2005 | Bruning et al. | ............... | 345/102 |
| 6,894,442 B1 * | 5/2005 | Lim et al. | ...................... | 315/291 |
| 7,009,343 B2 * | 3/2006 | Lim et al. | ...................... | 315/150 |
| 7,012,382 B2 * | 3/2006 | Cheang et al. | ............... | 315/291 |
| 7,026,769 B2 * | 4/2006 | Lee et al. | ...................... | 315/291 |
| 7,135,664 B2 * | 11/2006 | Vornsand et al. | ............. | 250/205 |
| 7,317,403 B2 * | 1/2008 | Grootes et al. | ........... | 340/815.45 |
| 7,348,960 B2 * | 3/2008 | Huang et al. | .................. | 345/102 |
| 7,397,205 B2 * | 7/2008 | Huang et al. | .................. | 315/360 |
| 7,511,695 B2 | 3/2009 | Furukawa | | |
| 7,566,143 B2 * | 7/2009 | Furukawa et al. | ............ | 362/231 |
| 7,638,754 B2 * | 12/2009 | Morimoto et al. | ............ | 250/226 |
| 7,656,374 B2 * | 2/2010 | Shen et al. | ..................... | 345/87 |
| 7,759,882 B2 * | 7/2010 | Korcharz et al. | ............. | 315/312 |
| 2003/0076056 A1 * | 4/2003 | Schuurmans | ................. | 315/291 |
| 2006/0021047 A1 * | 1/2006 | Cook | .............................. | 726/25 |
| 2006/0097978 A1 * | 5/2006 | Ng et al. | ....................... | 345/102 |
| 2007/0103934 A1 * | 5/2007 | Keh et al. | ...................... | 362/612 |
| 2008/0112164 A1 | 5/2008 | Teshirogi | | |

FOREIGN PATENT DOCUMENTS

| | | |
|---|---|---|
| JP | 2006/276725 | 10/2006 |
| JP | 2008/010397 | 1/2008 |

* cited by examiner

*Primary Examiner* — Grant Sitta

(57) ABSTRACT

In an embodiment, the invention provides a method of color control in a backlighting system comprising a plurality of light sources, a plurality of color sensors, a plurality of PWM controllers, and a video input for receiving video data. The plurality of light sources is activated during a first operative mode to produce white light. The plurality of light sources is controlled during a second operative mode to produce white light.

9 Claims, 4 Drawing Sheets

COLOR CONTROL OF A BACKLIGHTING SYSTEM

BACKGROUND

A liquid-crystal display (LCD) may be considered a variable light filter. Liquid crystals are trapped between two sheets of glass and walled off from one another into image bits called pixels. These crystals twist and untwist to let polarized light through, and filters placed in front of the pixels create the colors that emerge. Since an LCD only modifies light and does not create it, the quality of an LCD is dependent on the spectrum of light emerging into it from the rear, which is hereinafter referred to as backlighting.

A cold-cathode fluorescent lamp (CCFL) is often used for backlighting an LCD. One problem that often occurs with the use of a CCFL is that a relatively large amount of power is required to operate the CCFL. Another problem connected with the use of a CCFL is that a CCFL only produces an approximation of white light, not true white light. Since an LCD can only make color within the spectrum of the light it receives, a CCFL-based LCD has a color gamut (the extent of the mix of color a display is capable of producing) smaller than for example, a cathode-ray tube (CRT) or a plasma display. The CRT and the plasma display use energized phosphors to create purer colors.

An LED (Light Emitting Diode) array may also be used for backlighting an LCD. One advantage of using an LED array for backlighting an LCD is that the LED array is capable of generating greater spectral accuracy than a CCFL. For example, mixing the appropriate amount of light from red, green, and blue LEDs will produce white light. In addition, since the color balance of the white balance can be adjusted (by varying the relative intensity of the red, green, and blue LEDs), the color balance of an LCD may be maintained reasonably accurately over the operating life of the LCD. Another advantage of using an LED array for backlighting is that an LED array may provide better color saturation.

LEDs are generally not as fragile as CCFLs and as a result are more durable. Another advantage of using an LED array over CCFLs is that they usually have a longer functional lifetime. However, there are design challenges when using an LED array as a backlight for an LCD. Good uniformity is harder to achieve as the LEDs age with each LED possibly aging at a different rate. Also, the use of three separate light sources for red, green, and blue may cause the white point of the display to move as the LEDs age at different rates.

LEDs used for backlighting an LCD may be driven with DC voltage through a current limiting resistor. This approach is acceptable for many applications. When other considerations, (e.g. an extra bright display, low power consumption, or a backlight that can be controlled over a wide brightness range), are important, another method is often used.

A Pulse Width Modulation (PWM) method may have several advantages over the DC voltage method. A first advantage is that a brighter backlight may be achieved with a PWM method than the DC voltage method while using the same amount of power. For example, a LED backlight on an LCD using the DC voltage method LED may require a driving current for this display of 120 ma which produces a typical brightness of 50 NIT (a unit of measurement of the intensity of visible light, where 1 NIT is equal to one candela per square meter). If, instead of using the DC voltage method, a PWM method is used and five times the current, 600 ma, for ⅕ of the time is used, the average current is the same, 120 ma.

The average brightness of the LED would be the same if measured electronically. The difference is in the brightness perceived. The human eye has a certain amount of persistence. If exposed to a bright light the eye will "remember" the light for a short period of time. This allows us to view a motion picture or TV screen as a steady image when in fact it is flickering at 24 to 30 times a second. When an LED is flashed on brightly for a short time and then turned off, the eye "remembers" the light at the high brightness level. The result is that the perceived brightness of the backlight is closer to the high pulsed brightness than to the lower average DC brightness.

A PWM method may also be used to give a "normal" looking brightness level to the LCD but at a lower average current to save power. The average power may be cut by a factor of 30% to produce a given perceived brightness level.

The LED backlight brightness may also be varied while using the DC voltage method by varying the DC current to the LED's, but at low current the individual LED emitters become visible resulting in an uneven looking backlight.

Another use of the PWM method is to facilitate a wide range of brightness control for the LED backlight without an uneven looking backlight. By varying the duty cycle (pulse duration divided by the pulse period) of the controlling PWM waveform, a very wide range of brightness can be achieved while maintaining a very even appearing backlight.

DETAILED DESCRIPTION

The drawings and description, in general, disclose a method and apparatus for color control of a backlighting system. In one exemplary embodiment, video data from a video-processor is used to determine which segments of a backlighting system may be dimmed or brightened. Some of the advantages of color control of a backlighting system when used with an LCD display are improved dynamic color and brightness control, an enhanced picture contrast ratio, and improved power savings.

An enhanced picture contrast ratio may be obtained by dimming segments of the backlighting system that illuminate a "dark" region of an LCD display. Improved power savings may be achieved by dimming one or more of the segments of the backlighting system whenever necessary.

Figure 1:
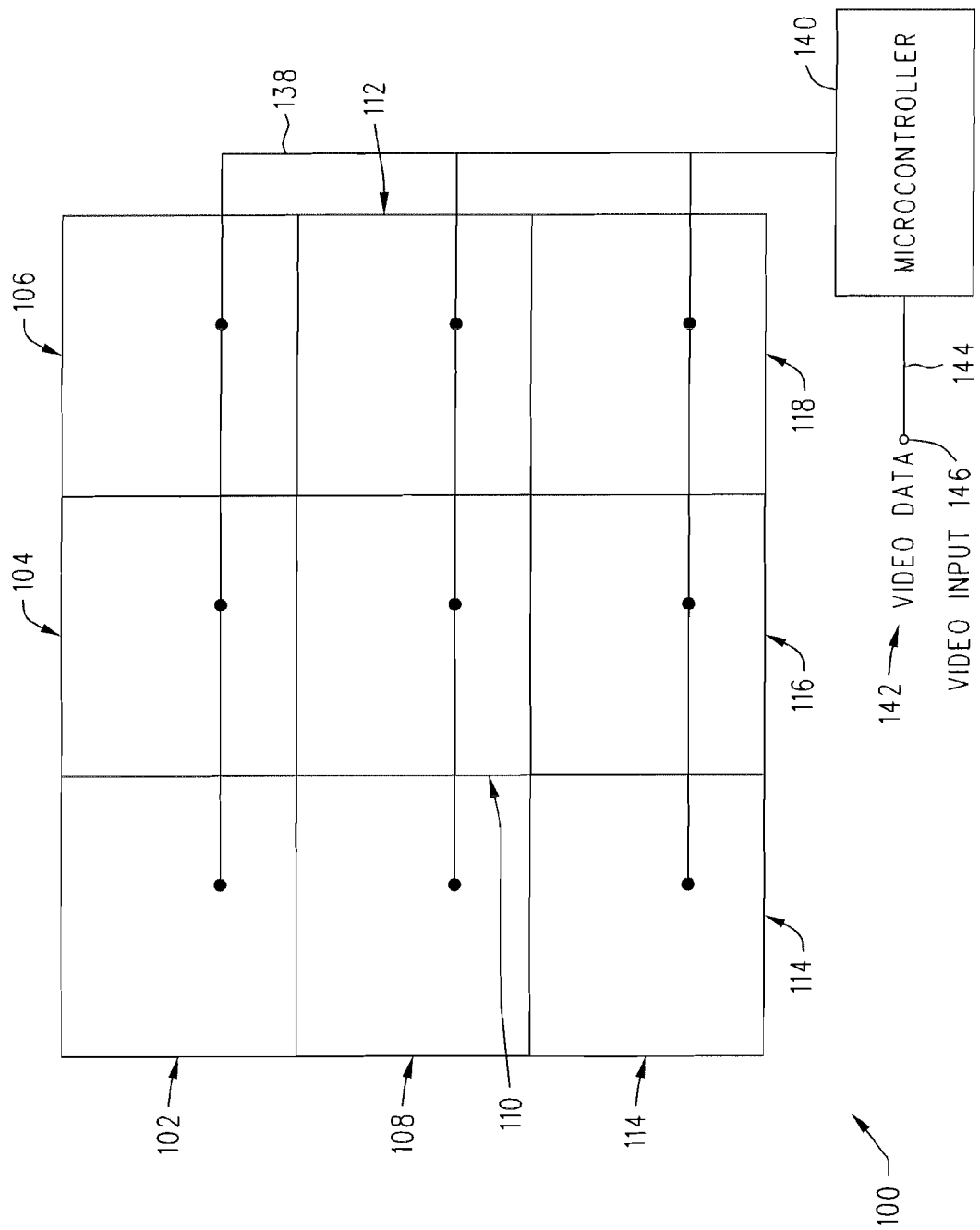
FIG. 1 is a block diagram illustrating control of a nine-segment backlighting system.

FIG. 1 is a block diagram illustrating control of a nine-segment, 3×3, backlighting system 100. A backlighting system may have any number of segments. For example, a backlighting system may comprise 16 segments (4×4), 25 segments (5×5), N×N segments, or M×N segments. Video data 142 for example is sent to a video input 146. The video data 142 used to drive an LCD display is sent to a microcontroller 140 via an electrical connection 144. The microcontroller 140 in this example determines from the video data 142 whether any of the segments, 102-118, may be dimmed. After determining which segments, 102-118, may be dimmed, the microcontroller 140 dims the appropriate segments through control of an electrical bus 138. The microcontroller 140, through the electrical bus 138, may dim one or more segments at any given time. In addition, the microcontroller 140, through the electrical bus 138, may change the color point of one or more segments at any given time.

In one exemplary embodiment, each segment, 102-118, contains a light source 210, color sensors 206, and a PWM controller 218.

Figure 2:
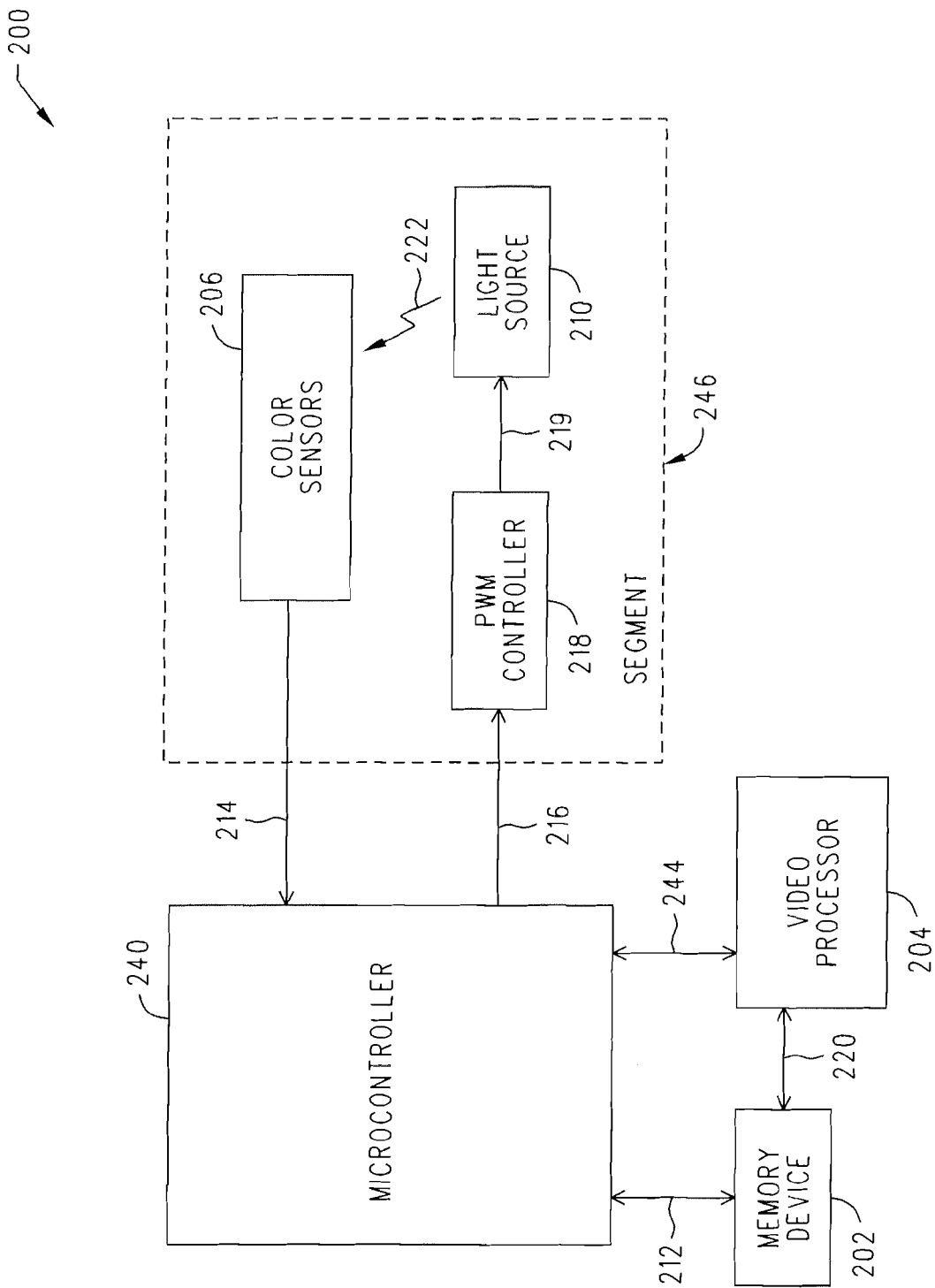
FIG. 2 is a block diagram of an exemplary embodiment of an apparatus for color control of a backlighting system.

FIG. 2 is a block diagram of an exemplary embodiment of an apparatus for color control of a backlighting system. Video-processor 204 communicates with microcontroller 240 using electrical connection 244. Electrical connection 244 may be any suitable serial or parallel connection. In particular, video-processor 204 provides video data to the microcontroller 240. The video data is also used to provide display information for an LCD display (not shown). Video-processor 204 also communicates with memory device 202 using electrical connection 220. The type of memory device 202 used includes but it not limited to EEPROMs, SRAMs, and DRAMs. Electrical connection 220 may be any suitable serial or parallel connection.

Microcontroller 240 communicates with video-processor 204 using electrical connection 244. Microcontroller 240 also communicates with memory device 202 using electrical connection 212. Electrical connection 212 may be any suitable serial or parallel connection. One suitable connection would be an I2C connection, as provided by the I2C-Bus Specification available from Philips Semiconductors. Microcontroller 240 also communicates with color sensors 206 using electrical connection 214. Electrical connection 214 may be any suitable serial or parallel connection. One suitable connection would be an I2C connection. Microcontroller 240 also communicates with PWM controller 218 using electrical connection 216. Electrical connection 216 may be any suitable serial or parallel connection.

Color sensors 206 communicate with microcontroller 240 using electrical connection 214. Color sensors 206 measure light 222, radiated from light source 210. PWM controller 218 communicates with light source 210 using electrical connection 219. Electrical connection 219 may be any suitable serial or parallel connection. A segment 246 includes color sensors 206, a PWM controller 218, and a light source 210.

The light source 210 creates a predetermined spectral content. The spectral content may be "white" for example. White light is commonly used for backlighting an LCD. LEDs, for example, may be used as a light source 210 and in particular as a source of white light. A combination of red, green and blue LEDs, for example, may be used to create white. However, other combinations of LEDs with different colors may be used as well. In addition, one or more white LEDs may be used as a source of white light. The number and arrangement of LEDs and the color sensors 206 is determined largely by the light output of the LEDs and the light output needed.

FIG. 2 illustrates how a microcontroller 240 communicates with a single segment 246. However, as shown in FIG. 1, a microcontroller 140 may communicate with one or more segments 102-118.

In a first operative mode (e.g. before video data is displayed on an LCD display), light 222 from a light source 210 is measured by the color sensors 206. During the first operative mode, each of the segments 102-118 operates in "closed loop" mode (with optical feedback) to calculate the optimum duty cycle ratio based on factory calibration data and initial factory-determined full brightness settings. The calibration data is unique for each of the segments 102-118 respectively.

In the context of a tri-primary luminary system, duty cycle ratio is the ratio of duty cycle between red, green, and blue LEDs. Assuming a 12-bit resolution PWM controller, a duty cycle may range from 0 to 4095 slots (within a PWM cycle). For example, to obtain a certain white resultant color from a tri-primary luminary system, the duty cycle for red, green, and blue LEDs is 2000/4095, 3900/4095, and 300/4095 respectively. The duty cycle ratio for this particular white resultant color would be 2000:3900:300 or 6.67:13:1.

In an exemplary embodiment, color sensors 206 from each of the segments 102-118 measures light 222 radiated from its own light source 210. In this exemplary embodiment, the color sensors 206 from each of the segments 102-118 send information to the microcontroller 240 for the microcontroller 240 to calculate an optimum duty cycle ratio for each of the segments 102-118 respectively. The microcontroller 240 then sends the computed duty cycle ratios for each segment 102-118 to the PWM controller 218.

In a second operative mode, with each segment 102-118 operating according to its previously calculated duty cycle ratio in "open loop" mode (with no optical feedback), the microcontroller 240 communicates with the color sensors 206 of each segment 102-118 to determine which LED of each segment 102-118 is operating at the highest brightness. After the brightest LED for each segment 102-118 is determined, the brightness value for the brightest LED of each segment 102-118 is stored in the memory device 202.

After the brightness value for each segment 102-118 is determined and stored in memory 202, the microcontroller 240 continues to read the color sensors 206 readings for the brightest LED of each segment 102-118. In this exemplary embodiment, it is assumed that the thermal characteristics of the brightest LED in each segment 102-118 represents the thermal characteristics of the other LEDs in that particular segment 102-118.

If the brightness value for the brightest LED of a segment 102-118 falls below a threshold value, the microcontroller 140 instructs all the segments 102-118 to switch to "closed loop" mode. While in the closed loop mode, each segment will compensate the degradation in LED response with a new set of duty cycle ratios. The new set of duty cycle ratios is sent to the PWM controllers 218 respectively and to the memory device 202.

In addition to controlling brightness as described above, an exemplary embodiment of this intention may also control the color point of the segments 102-118.

In a third operative mode the video-processor 204 analyses video data alone or together with the microcontroller 240, to determine which segments 102-118 should have its brightness scaled down or up. The brightness of a segment may be scaled up if its brightness was scaled down in a previous cycle. After determining which segments 102-118 should have its brightness increased or decreased, a scaling index for each segment 102-118 is stored in the memory device 202. The microcontroller 240 then reads from the memory device 202 to determine which segments need to be scaled up or down. After it is determined which segments need to be scaled up or down, the microprocessor 240 will scale the duty cycle ratio for each these segments based on the scaling index.

The pre-scaled duty cycle ratios for the target segments are then read from the segments' PWM controller 218 by the microcontroller 240. The pre-scaled duty cycle ratios are then scaled back based on the scaling index and written back to the respective PWM controller 218. The PWM controller 218 will not act on the new scaled values until the video processor 204 issues a synchronize trigger signal to the microcontroller 240.

After receiving the sync trigger signal from the video processor 204, the microcontroller 240 will latch the new scaled duty cycle ratios into the PWM controllers 218 respectively.

After the new scaled duty cycle ratios are latched into the PWM controllers 218, the selected segments' brightness is either increased of decreased.

Figure 4:
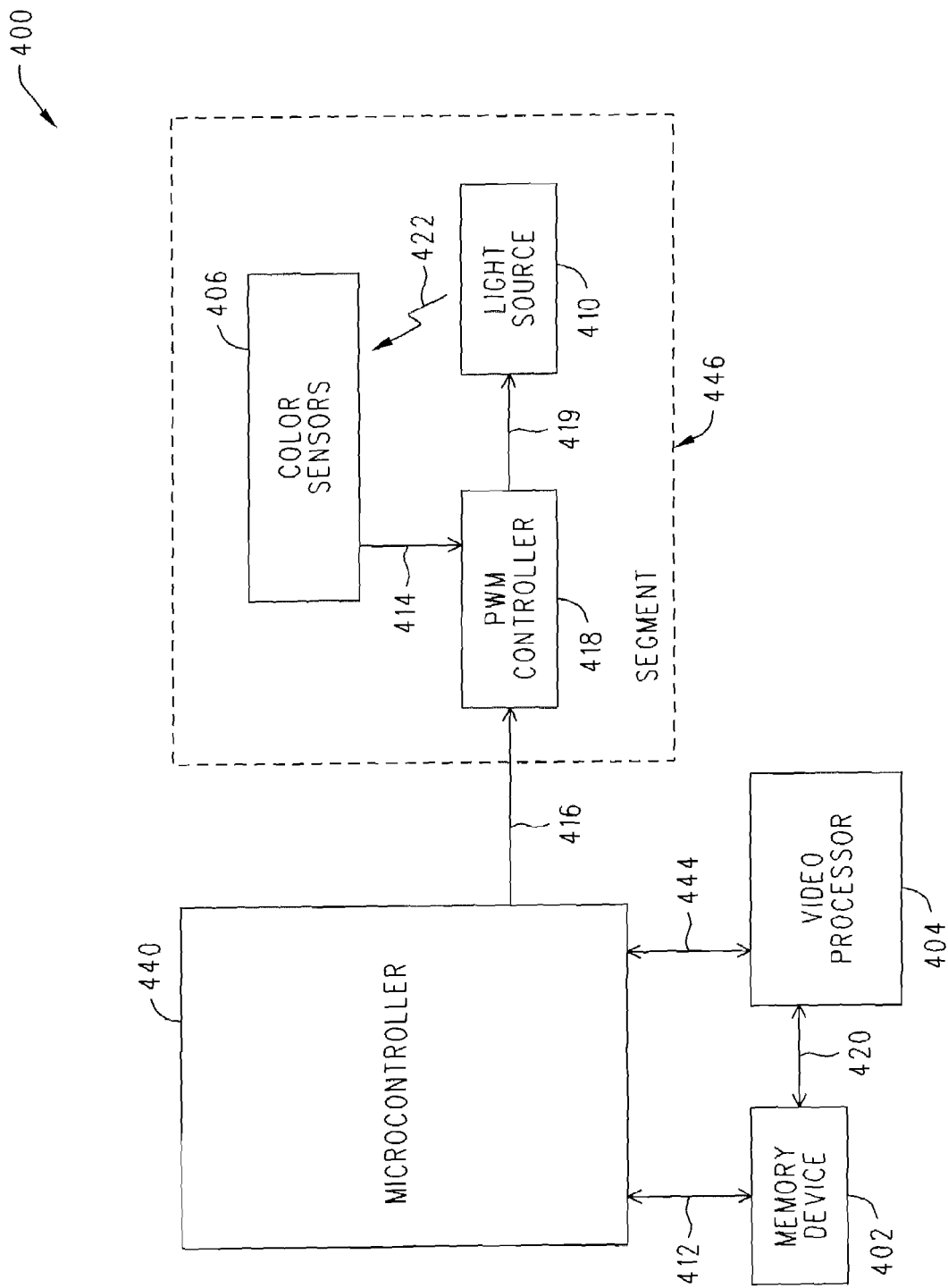
FIG. 4 is a block diagram of an exemplary embodiment of an apparatus for color control of a backlighting system

FIG. 4 is a block diagram of an exemplary embodiment of an apparatus for color control of a backlighting system. Video-processor 404 communicates with microcontroller 440 using electrical connection 444. Electrical connection 444 may be any suitable serial or parallel connection. In particular, video-processor 404 provides video data to the microcontroller 440. The video data is also used to provide display information for an LCD display (not shown). Video-processor 404 also communicates with memory device 402 using electrical connection 420. The type of memory device 402 used includes but it not limited to EEPROMs, SRAMs, and DRAMs. Electrical connection 420 may be any suitable serial or parallel connection.

Microcontroller 440 communicates with video-processor 404 using electrical connection 444. Microcontroller 440 also communicates with memory device 402 using electrical connection 412. Electrical connection 412 may be any suitable serial or parallel connection. One suitable connection would be an I2C connection, as provided by the I2C-Bus Specification available from Philips Semiconductors. One suitable connection would be an I2C connection. Microcontroller 440 also communicates with PWM controller 418 using electrical connection 416. Electrical connection 416 may be any suitable serial or parallel connection.

Color sensors 406 communicate with PWM controller 440 using electrical connection 414. Color sensors 406 measure light 422, radiated from light source 410. PWM controller 418 communicates with light source 410 using electrical connection 419. Electrical connection 419 may be any suitable serial or parallel connection. A segment 446 includes color sensors 406, a PWM controller 418, and a light source 410.

The light source 410 creates a predetermined spectral content. The spectral content may be "white" for example. White light is commonly used for backlighting an LCD. LEDs, for example, may be used as a light source 410 and in particular as a source of white light. A combination of red, green and blue LEDs, for example, may be used to create white. However, other combinations of LEDs with different colors may be used as well. In addition, one or more white LEDs may be used as a source of white light. The number and arrangement of LEDs and the color sensors 406 is determined largely by the light output of the LEDs and the light output needed.

FIG. 4 illustrates how a microcontroller 440 communicates with a single segment 446. However, as shown in FIG. 1, a microcontroller 140 may communicate with one or more segments 102-118.

In a first operative mode (e.g. before video data is displayed on an LCD display), light 422 from a light source 410 is measured by the color sensors 406. During the first operative mode, each of the segments 102-118 operates in "closed loop" mode (with optical feedback) to calculate the optimum duty cycle ratio based on factory calibration data and initial factory determined full brightness settings. The calibration data is unique for each of the segments 102-118 respectively. However, during a full brightness setting the calibration data is the same for each of the segments 102-118.

In an exemplary embodiment, color sensors 406 from each of the segments 102-118 measures light radiated from its own light source 410. In this exemplary embodiment, the color sensors 406 from each of the segments 102-118 send information to their respective PWM controllers 418 to calculate an optimum duty cycle ratio for each of the segments 102-118 respectively.

In an exemplary embodiment, the microcontroller 440 transfers calibration data to all segments 102-118. While in this mode, the PWM controller 418 for each segment 102-118 calculate their own duty cycle ratio based on the information sent from their own color sensors 406. The calculated duty cycle ratio for segments 102-118 is stored in its respective PWM controller 418. After storing the calculated duty cycle ratios in their respective PWM controller 418, the microcontroller switches all segments 102-118 into open loop mode.

In a second operative mode, with each segment 102-118 operating according to its previously calculated duty cycle ratio in "open loop" mode (with no optical feedback), the microcontroller 440 communicates with the color sensors 406 of each segment 102-118 to determine which LED of each segment 102-118 is operating at the highest brightness. After the brightest LED for each segment 102-118 is determined, the brightness value for the brightest LED of each segment 102-118 is stored in the memory device 402.

After the brightness value for each segment 102-118 is determined and stored in memory 402, the microcontroller 440 continues to read the color sensors 406 readings for the brightest LED of each segment 102-118. In this exemplary embodiment, it is assumed that the thermal characteristics of the brightest LED in each segment 102-118 represents the thermal characteristics of the other LEDs in that particular segment 102-118.

If the brightness value for the brightest LED of a segment 102-118 falls below a threshold value, the microcontroller 440 instruct all the segments 102-118 to switch to "closed loop" mode. While in the closed loop mode, each segment will compensate the degradation in LED response with a new set of duty cycle ratios.

In addition to controlling brightness as described above, an exemplary embodiment of this intention may also control the color point of the segments 102-118.

In a third operative mode the video-processor 404 analyses video data alone or together with the microcontroller 440, to determine which segments 102-118 should have its brightness scaled down or up. The brightness of a segment may be scaled up if its brightness was scaled down in a previous cycle. After determining which segments 102-118 should have its brightness increased or decreased, a scaling index for each segment 102-118 is stored in the memory device 402. The microcontroller 440 then reads from the memory device 402 to determine which segments need to be scaled up or down. After it is determined which segments need to be scaled up or down, the microprocessor 440 will scale the duty cycle ratio for each these segments based on the scaling index.

The pre-scaled duty cycle ratios for the target segments are then read from the segments' PWM controller 418 by the microcontroller 440. The pre-scaled duty cycle ratios are then scaled back based on the scaling index and written back to the respective PWM controller 418. The PWM controller 418 will not act on the new scaled values until the video processor 404 issues a synchronize trigger signal to the microcontroller 440.

After receiving the sync trigger signal from the video processor 404, the microcontroller 440 will latch the new scaled duty cycle ratios into the PWM controllers 418 respectively. After the new scaled duty cycle ratios are latched into the PWM controller 418, the selected segments' brightness are either increased of decreased.

Figure 3:
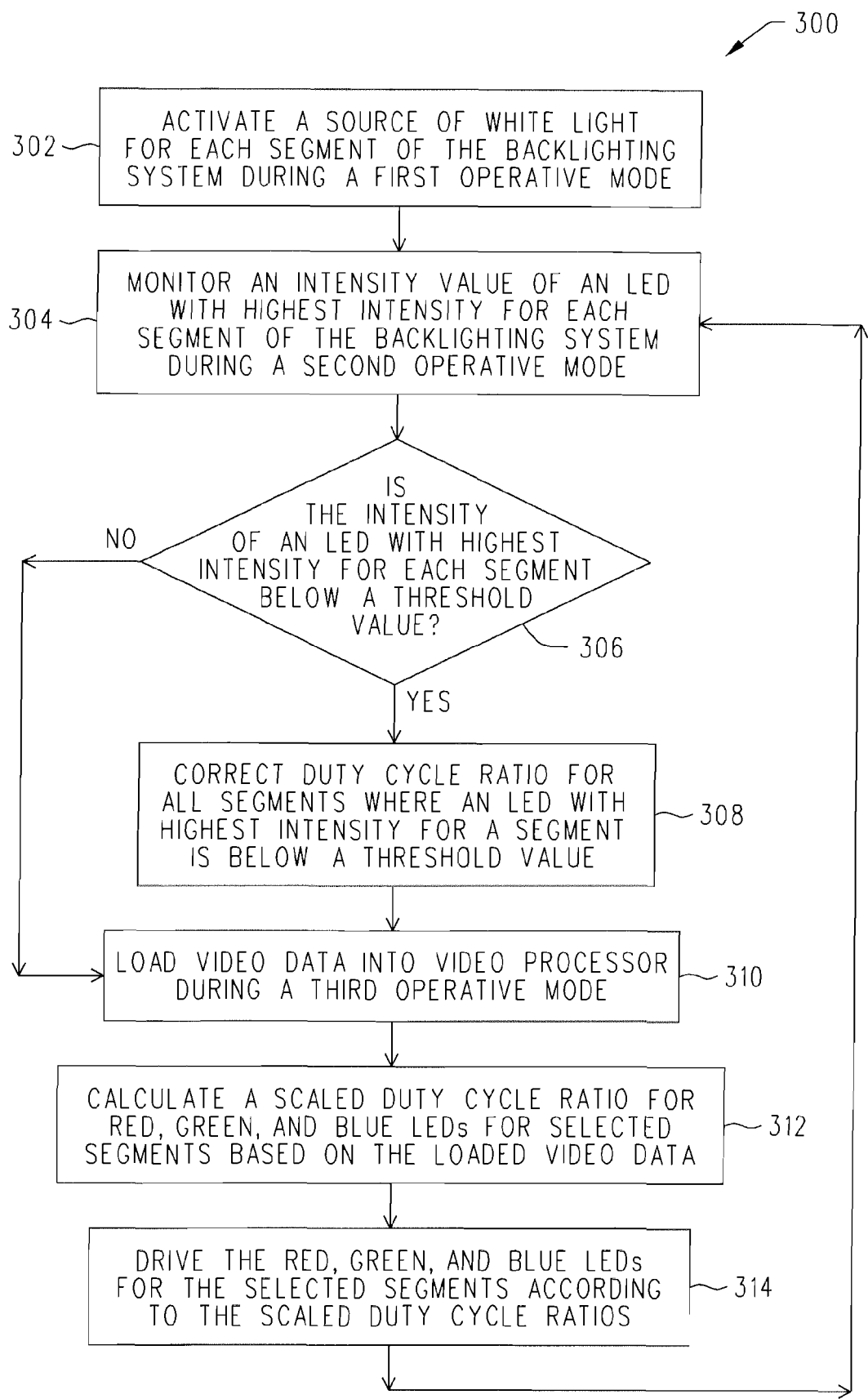
FIG. 3 is a flow chart illustrating an exemplary embodiment of a method for color control of a backlighting system.

FIG. 3 is a flow chart illustrating an exemplary embodiment of a method for color control of a backlighting system 300. Box 302 describes activating a source of white light for each segment of the backlighting system 200 during a first operative mode. In one exemplary embodiment, activating a source of white light for each segment includes 1) calculating optimum duty cycle ratios for each segment 108-118 based on factory calibration data and feedback from the color sensors 406, and 2) sending the optimum duty cycle ratios to the PWM controllers 218 of each segment 102-118.

After activating a source of white light for each segment, 246, of the backlighting system, 200, during a first operative mode, the source of white light for each segment, 246, of the backlighting system, 200, is maintained during a second operative mode. Box 304 describes monitoring the source of white light for each segment, 246, of the backlighting system 200 during the second operative mode. In one exemplary embodiment the source of white light for each segment 246 of the backlighting system 200 is monitored on each cycle of the microcontroller 240 by measuring the intensity value of the LED with the highest intensity for each segment 246.

As illustrated in boxes 306 and 308, if the intensity of an LED with the highest intensity for each segment 246 is below a threshold, the duty cycle ratio for these segments is corrected. During the second mode of operation when the duty cycle ratio for these segments is corrected, the system operates in open loop mode.

As illustrated in box 306, if the intensity of an LED with the highest intensity for each segment is not below a threshold, the duty cycle ratio does not need to be recalculated. Instead video data is loaded into a video processor 204 as illustrated in box 310.

During the third operative mode, video data is loaded into video processor 204. The video processor 204 alone or the video processor 204 and the microcontroller 240 together determine which segments need to be scaled up or down. After it is determined which segments should be scaled up or down, a scaling index is calculated for each of the selected segments. This is illustrated in box 312.

After calculating a scaled duty cycle ratio for selected segments based on the loaded video data, the microcontroller 240 transfers the scaled duty cycle ratios to the PWM controllers 218 of the respective segments 102-118. The PWM controllers 218 then drive the light sources 210 of their respective segments 102-118 based on the scaled duty cycle ratios. This is illustrated in box 314. Scaling down a segment dims that particular segment. Scaling a duty cycle ratio only changes the intensity of the white light generated; it does not change the spectral content of the white light.

An advantage of reducing the intensity of a particular segment is that a higher contrast ratio may be achieved in the backlighting system 200. Another advantage of reducing the intensity of a particular segment is that power used by the backlighting system 200 is reduced.

After the PWM controller 218 drives the light source 210 based on the scaled duty cycle ratios, the microcontroller 240 returns to monitoring an intensity value of an LED with the highest intensity for each segment, 246, of the backlighting system, 200, at each clock cycle of the microcontroller 240.

Various computer readable or executable code or electronically executable instructions may be used to create an exemplary embodiment of the method of color control in a backlighting system 200. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store the code or instructions for use by or in connection with the instruction-executing device. For example, the storage medium may include (but is not limited to) any electronic, magnetic, optical, or other storage device. The storage medium may even comprise an electronic circuit, with the code or instructions represented by the design of the electronic circuit. Specific examples include magnetic or optical disks, both fixed and removable, semiconductor memory devices such as a memory card and read-only memories (ROMs), including programmable and erasable ROMs, non-volatile memories (NMMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device.

The above-described embodiments of the present invention have been directed to use with an LCD. However, embodiments intended for other applications can also be constructed. For example, color control is of extreme interest in applications such as lighting of cosmetic counters, and food outlets.

The foregoing description has been presented for purposes of illustration and description. It is not intended to be exhaustive or to limit the invention to the precise form disclosed, and other modifications and variations may be possible in light of the above teachings. The exemplary embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A method of color control in a backlighting system comprising a video input for receiving video data, a memory, a plurality of pulse width modulation (PWM) controllers and a plurality of segments, each of the plurality of segments comprises a plurality of light sources and a color sensor, the method comprising:

activating the plurality of light sources in a closed loop arrangement using operative feedback received from the color sensor during a first operative mode to produce white light in at least one of the plurality of segments;

measuring spectral contents of the plurality of light sources in the at least one of the plurality of segments to compute duty cycle ratio for the plurality of light sources in the at least one of the plurality of segments;

storing the duty cycle ratio information; and controlling the plurality of light sources in an open loop arrangement independent of receiving operative feedback from the color sensor during a second operative mode to produce the white light using the duty cycle ratio computed in the closed loop arrangement of the first operative mode, wherein each of the plurality of segments is configurable to operate at a different intensity; and wherein controlling the white light for the segment of the backlighting system during the second operative mode comprises:

determining a plurality of brightest LEDs, each corresponding to a respective one LED operating at highest brightness for each of the plurality of segments; and for each of the plurality of segments calculating a respective second duty cycle ratio if the respective one LED operating at highest brightness is below a predetermined value.

2. The method of claim 1 further comprising:
changing the intensity of the white light in at least one of the plurality of segments during a third operative mode;
wherein changing the intensity of the white light is based in part on the video data during the third operative mode.

3. The method of claim 1 further comprising:
changing a color point of the white light in at least one of the plurality of segments during a third operative mode;
wherein changing the color point of the white light is based in part on the video data during the third operative mode.

4. The method of claim 1 wherein the plurality of light sources comprise at least one red LED, at least one green LED, and at least one blue LED.

5. The method of claim 2, wherein changing the intensity of the white light for the segment of the backlighting system during a third operative mode comprises:
determining a scaling index for the plurality of light sources; and
calculating a third duty cycle ratio based on the scaling index;
wherein the third duty cycle ratio is transferred to the PWM controller during the third operative mode.

6. The method of claim 5 further comprising driving the plurality of light sources with the third duty cycle ratio when a sync trigger signal is communicated to the segment.

7. The method of claim 1, wherein the first operative mode is before video data being displayed.

8. The method of claim 1, wherein the plurality of segments are arranged in a plurality of segment rows and a plurality of segment columns in a two-dimensional plane.

9. A method of color control in a backlighting system comprising a video input for receiving video data, a memory, a plurality of pulse width modulation (PWM) controllers and a plurality of segments, each of the plurality of segments comprising a plurality of LEDs and a color sensor, the method comprising:

activating the plurality of LEDs during a first operative mode to produce white light in at least one of the plurality of segments;

measuring spectral contents of the plurality of LEDs in the at least one of the plurality of segments to compute duty cycle ratio for the plurality of LEDs in the at least one of the plurality of segments;

storing the duty cycle ratio information;

controlling the plurality of LEDs during a second operative mode to produce the white light using the duty cycle ratio computed in the first operative mode, wherein each segment is configurable to operate at a different intensity;

determining a plurality of brightest LEDs, each corresponding to a respective one LED operating at highest brightness for each of the plurality of segments; and for each of the plurality of segments calculating a respective second duty cycle ratio if the respective one LED operating at highest brightness is below a predetermined value.

* * * * *